(12) United States Patent
Zhao et al.

(10) Patent No.: US 11,026,098 B2
(45) Date of Patent: Jun. 1, 2021

(54) ELECTRONIC DEVICE, WIRELESS COMMUNICATION METHOD AND COMPUTER-READABLE MEDIUM

(71) Applicant: Sony Corporation, Tokyo (JP)

(72) Inventors: Youping Zhao, Beijing (CN); Kangyi Liu, Beijing (CN); Chen Sun, Beijing (CN); Xin Guo, Beijing (CN)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/634,170

(22) PCT Filed: Sep. 30, 2018

(86) PCT No.: PCT/CN2018/108940
§ 371 (c)(1),
(2) Date: Jan. 27, 2020

(87) PCT Pub. No.: WO2019/072125
PCT Pub. Date: Apr. 18, 2019

(65) Prior Publication Data
US 2021/0099891 A1    Apr. 1, 2021

(30) Foreign Application Priority Data
Oct. 9, 2017    (CN) .......................... 201710930870.2

(51) Int. Cl.
*H04W 16/18* (2009.01)
*H04W 24/02* (2009.01)

(52) U.S. Cl.
CPC ........... *H04W 16/18* (2013.01); *H04W 24/02* (2013.01)

(58) Field of Classification Search
CPC ..................................................... H04W 16/14
See application file for complete search history.

(56) References Cited

U.S. PATENT DOCUMENTS

| | | | |
|---|---|---|---|
| 9,635,560 B2* | 4/2017 | Lopes | H04W 72/00 |
| 2009/0163237 A1* | 6/2009 | Abedi | H04W 16/14 |
| | | | 455/501 |

(Continued)

FOREIGN PATENT DOCUMENTS

| | | |
|---|---|---|
| CN | 102244869 A | 11/2011 |
| CN | 105338534 A | 2/2016 |

(Continued)

OTHER PUBLICATIONS

International Search Report and Written Opinion dated Jan. 9, 2019 for PCT/CN2018/108940 filed on Sep. 30, 2018, 8 pages including English Translation of the International Search Report.

(Continued)

*Primary Examiner* — Kevin Kim
(74) *Attorney, Agent, or Firm* — Xsensus LLP

(57) ABSTRACT

The present disclosure relates to an electronic device, a wireless communication method and computer-readable medium. According to one embodiment, an electronic device used for wireless communication comprises a processing circuit. The processing circuit is configured to: estimate the communication service modes for a user equipment within a target time segment on the basis of a time-variant multi-status model; and on the basis of the estimated communication service modes, to determine the size of a primary user protection area to be applied to the user equipment.

16 Claims, 16 Drawing Sheets

(56) References Cited

U.S. PATENT DOCUMENTS

| | | | |
|---|---|---|---|
| 2012/0122477 A1 | 5/2012 | Sadek et al. | |
| 2015/0036509 A1* | 2/2015 | Lopes | H04L 5/0041 370/241.1 |
| 2017/0134241 A1 | 5/2017 | Jang et al. | |
| 2017/0202001 A1 | 7/2017 | Guo | |
| 2017/0318470 A1* | 11/2017 | Srikanteswara | H04W 16/14 |
| 2017/0332243 A1* | 11/2017 | MacMullan | H04B 17/318 |

FOREIGN PATENT DOCUMENTS

| | | |
|---|---|---|
| CN | 106131956 A | 11/2016 |
| WO | 2008/030896 A2 | 3/2008 |

OTHER PUBLICATIONS

Extended European search report dated Sep. 28, 2020, in corresponding European patent Application No. 18867071.5, 8 pages.

* cited by examiner

ELECTRONIC DEVICE, WIRELESS COMMUNICATION METHOD AND COMPUTER-READABLE MEDIUM

CROSS-REFERENCE TO RELATED APPLICATIONS

The present application is based on PCT filing PCT/CN2018/108940, filed Sep. 30, 2018, which claims priority to CN 201710930870.2, filed Oct. 9, 2017, the entire contents of each are incorporated herein by reference.

TECHNICAL FIELD

The present disclosure relates generally to the field of wireless communication, such as dynamic spectrum sharing and cognitive radio. More particularly, the present disclosure relates to an electronic device for wireless communication, a wireless communication method and a computer readable medium.

BACKGROUND

There exists a spectrum management manner of: dividing users into primary users and secondary users, the primary users having preferential access rights for spectrums relative to the secondary users, and stipulating to perform a geographical exclusion zone division for the primary users to be free of interference by other users.

SUMMARY

A brief summary of embodiments of the present invention is given below to provide a basic understanding of some aspects of the present invention. It should be understood that the following summary is not an exhaustive summary of the present invention. It does not intend to define a key or important part of the present invention, nor does it intend to limit the scope of the present invention. The object of the summary is only to briefly present some concepts, which serves as a preamble of the detailed description that follows.

According to an embodiment, there is provided an electronic device for wireless communication, comprising processing circuitry. The processing circuitry is configured to: estimate, based on a time-varying multistate model, a communication service mode of a user equipment within a target time period; and determine, based on the estimated communication service mode, a size of a primary exclusion zone to be applied to the user equipment.

According to another embodiment, there is provided a wireless communication method, comprising: estimating, based on a time-varying multistate model, a communication service mode of a user equipment within a target time period; and determining, based on the estimated communication service mode, a size of a primary exclusion zone to be applied to the user equipment.

According to still another embodiment, there is provided an electronic device for wireless communication, comprising processing circuitry. The processing circuitry is configured to: perform control to receive indication information from a control node, the indication information indicating a size of a primary exclusion zone to be applied to a user equipment, wherein the size of the primary exclusion zone is determined based on an estimation of a communication service mode of the user equipment within a target time period, the estimation being based on a time-varying multistate model.

According to yet another embodiment, there is provided a wireless communication method, comprising: receiving indication information from a control node, the indication information indicating a size of a primary exclusion zone to be applied to a user equipment, wherein the size of the primary exclusion zone is determined based on an estimation of a communication service mode of the user equipment within a target time period, the estimation being based on a time-varying multistate model.

Embodiments of the present disclosure further include a computer readable medium comprising executable instructions that, when executed by an information processing apparatus, cause the information processing apparatus to perform the methods according to the embodiments of the present disclosure.

According to the embodiments of the present disclosure, it is possible to improve a utilization rate of radio spectrum resources while effectively protecting a primary user against interference by other users.

BRIEF DESCRIPTION OF THE DRAWINGS

The present invention could be better understood with reference to the description given below in combination with the appended drawings, wherein throughout the appended drawings, identical or like reference signs are used to represent identical or like components. The appended drawings together with the detailed description below are included in the specification and form a part of the specification, and are used to further describe preferred embodiments of the present invention and explain the principles and advantages of the present invention by way of examples. In the appended drawings.

DETAILED DESCRIPTION

Hereinafter, embodiments of the present invention will be described with reference to the appended drawings. Elements and features described in one figure or one embodiment of the present invention may be combined with elements and features described in one or more other figures or embodiments. It should be noted that, for the sake of clarity, representation and description of components and processing known to those ordinarily skilled which are irrelevant to the present invention are omitted in the appended drawings and the description.

Figure 1:
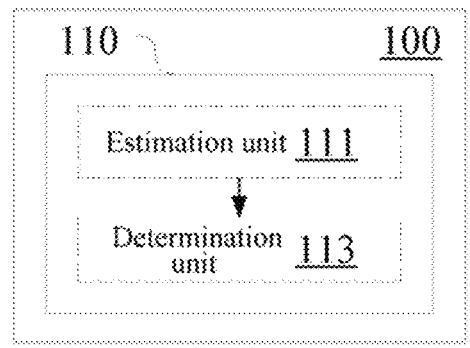
FIG. 1 is a block diagram showing a configuration example of an electronic device for wireless communication according to an embodiment of the present invention.

As shown in FIG. 1, an electronic device 100 for wireless communication according to an embodiment of the present invention comprises processing circuitry 110. The processing circuitry 110 may, for example, be realized as a specific chip, chipset or central processing unit (CPU) or the like.

The processing circuitry 110 comprises an estimation unit 111 and a determination unit 113. It should be noted that, although the estimation unit 111 and the determination unit 113 are shown in the form of functional blocks in the figure, it should be understood that the functions of these units may also be realized by the processing circuitry 110 as a whole but not necessarily realized by discrete, actual components in the processing circuitry 110. In addition, although the processing circuitry 110 is shown by one frame in the figure, the electronic device 100 may comprise a plurality of processing circuitries, and can distribute the functions of the estimation unit 111 and the determination unit 113 to the plurality of processing circuitries so as to implement these functions through cooperative operations of the plurality of processing circuitries.

The electronic device according to the present embodiment may be realized at control node side which includes, but is not limited to, base station side, core network side and user equipment side.

The estimation unit 111 is configured to estimate, based on a time-varying multistate model, a communication service mode of a user equipment within a target time period.

As an example but not a limitation, the multistate model may comprise a multistate Hidden Markov Model (HMM).

In prediction for a user behavior at present, a time-constant, two-state Hidden Markov is generally adopted to perform modeling, and a user state only has such two conditions as whether or not occupying a channel. As a typical time-invariant Hidden Markov Model, in predicting a user behavior, it is needed to consider a tendency and a temporal law of a user activity itself, and information as provided is also limited to whether or not a user needs to occupy a channel By adopting a time-varying multistate model, embodiments of the present disclosure make it possible to more precisely predict a user behavior, a user service type and the like, thereby making it possible to better protect a primary user.

In addition, influences by a geographical position and the like of a user upon a service of the user and upon a future displacement of the user are generally not considered in prediction for a user behavior at present. In some studies, expressions for probabilities of a user to occupy a channel and to not occupy a channel are derived based on an HMM, and an expression for channel state information prediction is derived by adopting the manner of training vectors based on the HMM, but these manners cause confidence of channel state information prediction to be relatively low and a user behavior analysis to be not complete enough in environments where user demands greatly differ. According to an embodiment of the present disclosure, the multistate model may be derived based on historical data which may comprise a user position and/or a user displacement (such as a movement direction and a velocity and the like), time and a user data traffic amount, etc.

Figure 7:
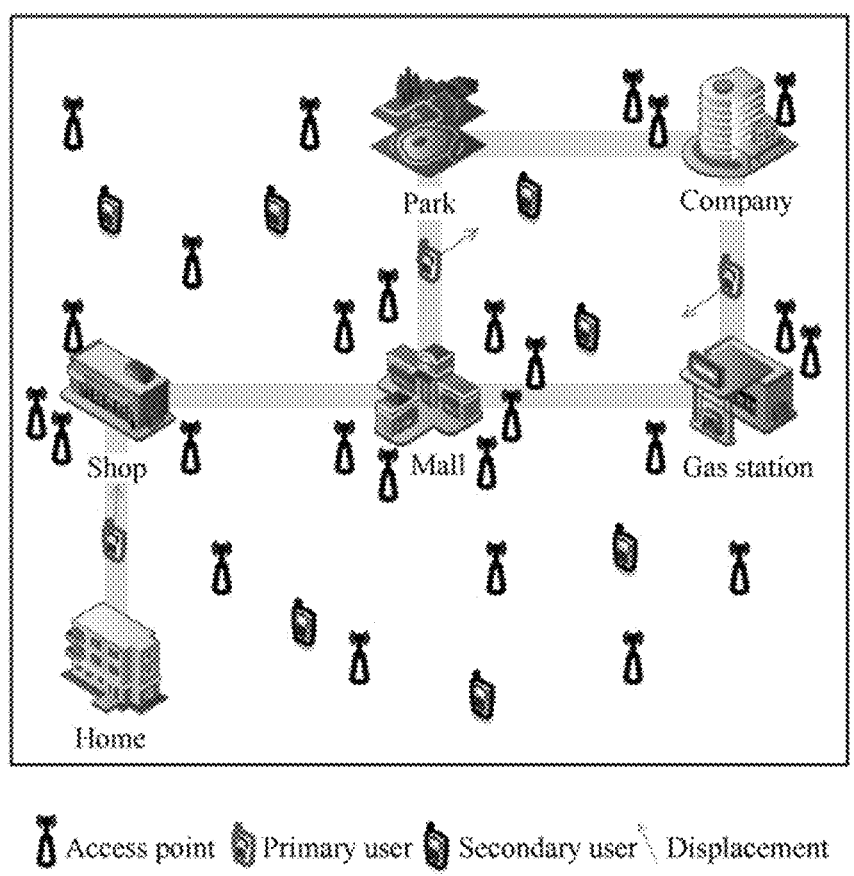
FIG. 7 is a schematic view for illustrating an application scenario of embodiments of the present invention.

FIG. 7 shows an application scenario of embodiments of the present invention. In the application scenario, an ultra dense network improves spatial multiplexing through dense deployment of small base stations, and this manner becomes an effective solution for solving improvements in data traffic and user experience rates in future 5G networks. However, interference caused by dense deployment of cells will reduce network capacity and user experience. One object of the solution of the present disclosure is to determine a range of a user exclusion zone and improve network capacity.

In addition, referring to FIG. 7, a user may have different service demands at different positions, for example, generally have relatively more service demands at some places (such as a mall, a shop, a park and the like) and generally have relatively less service demands at some places (such as a home, a company, a gas station and the like). Further, a user may have different service demands in different motion states, for example, generally have relatively more service demands in a stationary state and generally have relatively less service demands in a motion state. In addition, a user may have different service demands at different times, for example, generally have relatively more service demands in a leisure time period and generally have relatively less service demands in a working time period and a sleep time period.

Next, an exemplary manner of estimating a communication service mode of a user equipment within a target time period according to historical data will be illustrated.

According to an embodiment, the estimation unit 111 may be configured to: determine, based on historical data, a distribution type of data traffic amount of the user equipment in a plurality of historical time periods corresponding to the target time period; and estimate, based on the determined distribution type, the communication service mode of the user equipment within the target time period.

As an example but not a limitation, the historical time periods corresponding to the target time period may refer to that: the historical time periods and the target time period belong to corresponding time periods (e.g., daytime or night, or morning, ante meridiem, noon, afternoon, nightfall, night and midnight and the like, or time periods divided according to hours or more fine granularity) in one day; the historical time periods and the target time period belong to corresponding days (e.g., Monday, Tuesday, . . . Saturday and Sunday) in one week; the historical time periods and the target time period belong to working days (from Monday to Friday) or rest days (weekends, holidays, etc.).

Through a multistate model derived based on more historical data, it is possible to more precisely estimate a service demand of a user, thereby making it possible to better protect a primary user.

Further, according to an embodiment, the communication service mode may comprise a mode in which a probability distribution of a user data traffic amount is a heavy-tailed distribution, and a mode in which a probability distribution of a user data traffic amount is a light-tailed distribution.

The user behavior prediction methods at present generally use Poisson distribution to sketch a user's service demand. However, it was recognized by the inventor of the preset invention that, the traffic of a user burst service tends to observe a heavy-tailed distribution, but not to, as once assumed, observe a light-tailed distribution such as Poisson distribution and exponential distribution. The user burst traffic has relatively strong instability and generally has a relatively large data amount, and the traffic of the user burst service may be more precisely sketched using a heavy-tailed distribution such as general Pareto distribution and the like.

Figure 10:
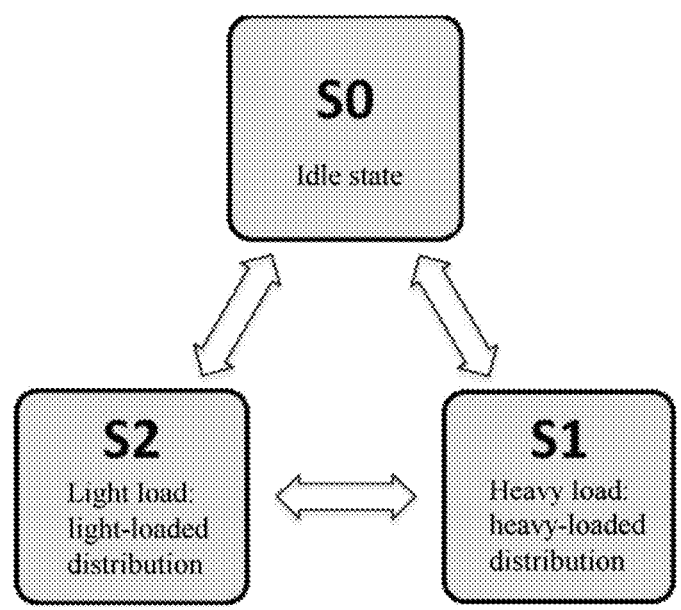
FIG. 10 is a schematic view for illustrating a multistate model in embodiments of the present disclosure.

FIG. 10 schematically shows a multistate model in an exemplary embodiment of the present disclosure, including an idle state (S0), a light load state (S1) and a heavy load state (S2).

The traditional Hidden Markov Model for describing a user behavior is a time-invariant, two-state Hidden Markov Model. The multistate model according to the embodiment of the present disclosure differs from the traditional mode. Further, a number of states of the multistate, time-varying Hidden Markov Model may be determined according to specific applications, and a time-varying characteristic causes a temporal tendency to be taken into consideration.

Next, an exemplary manner of deriving the multistate model based on historical data will be described with reference to a specific embodiment.

According to an embodiment, the multistate model may be derived by:

performing a first classification on user data traffic amounts according to time, user position and/or user displacement, based on a historical record of historical behavior of a primary user;

for each class obtained by the first classification, performing a second classification on probability distributions of the user data traffic amounts; and determining respective types of the probability distributions as a hypothesis set of the multistate model.

More specifically, the second classification may comprise:

for a classification result of the first classification, constructing a fitted probability density function for user data traffic amounts for a corresponding classification; and for the fitted probability density function, performing a classification of heavy-tailed distribution and light-tailed distribution.

The fitting of the above-mentioned probability density function may, for example, be performed by Kernel smoothing method.

Next, an exemplary process of a user behavior modeling will be described.

Step A1: converting historical behavior information of a primary user into a record of historical behavior information of the user, wherein content of the record may include, but is not limited to, a user identifier, a user position, user displacement information (velocity), a time and a user data traffic amount, etc.

Since a data amount of historical behavior data uploaded by the user may be relatively large, it is possible to convert the data into a record of historical behavior of the user in order to facilitate processing of original information. Table 1 is an example of the record, including user identifier (ID), user position, user velocity and time (time slice), as well as traffic data amount (length of packet) of the user within the time. Besides, a flag may be used to record some events, such as working days or holidays, so as to facilitate a classification to be performed on this dimension. In addition, it is also possible to provide a plurality of flags, so as to facilitate classifications to be performed on more dimensions.

TABLE 1

| User ID | Flag | Position | Velocity | Time Slice | Length of Packet |
| --- | --- | --- | --- | --- | --- |

Step A2: performing a classification on user data traffic amounts within a certain time according to time, user position, user displacement information and the like, based on the record of the historical behavior information of the primary user which was established in step A1;

Step A3: upon completion of the classification in step A2, performing a second classification on probability distributions observed by user data traffic amounts of the user for a corresponding classification class, wherein content of a hypothesis set in a classifier is a probability distribution which, for example, comprises a heavy-tailed distribution (such as Pareto distribution and the like) and a light-tailed distribution (such as Poisson distribution and the like).

Step A4: determining a number of states in a time-varying multistate Hidden Markov Model according to a number of probability distributions, wherein step A1 records times when corresponding probability distributions appear, making it possible to establish probabilities of the probability distributions to appear within a certain time period, thereby determining the time-varying multistate Hidden Markov Model, as shown in FIG. 10.

Step A5: persistently classifying, wherein if a probability distribution type which cannot be recognized appears, probability distributions of this type are added into a hypothesis set in a classifier, and the above-mentioned steps are repeated.

Figure 11B:
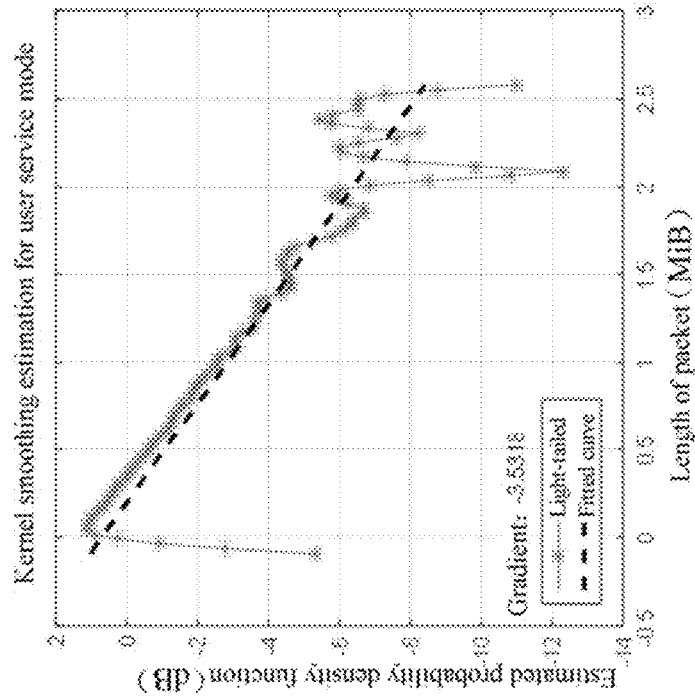
FIG. 11A and FIG. 11B show examples of data amount distributions in a heavy-tailed service mode and a light-tailed service mode, respectively.
Figure 11A:
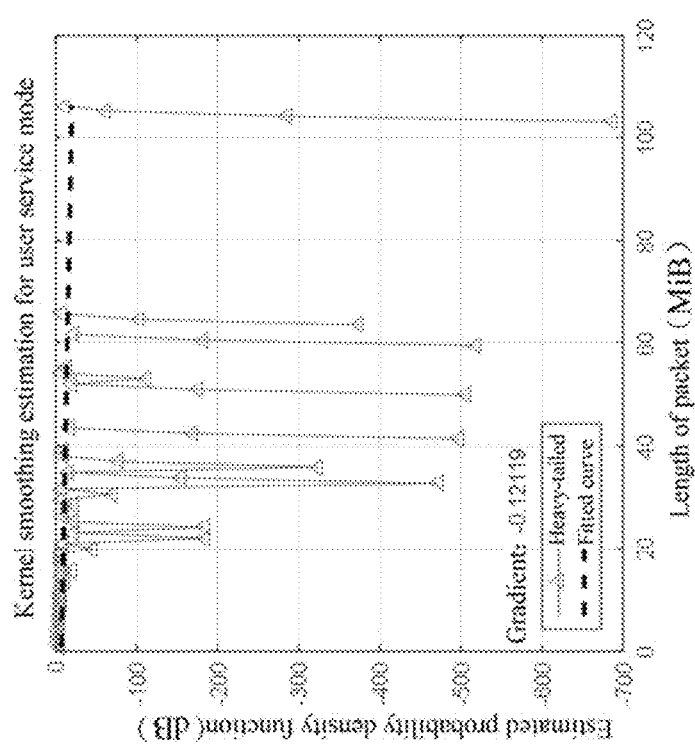

In the above-mentioned exemplary process, step A3 may comprise the following sub-processes (steps A31-A32, with classification schematic views being as shown in FIG. 11A and FIG. 11B):

Step A31: according to a classification result completed in step A2, constructing a fitted probability density function for user data traffic amounts for a corresponding classification, wherein adoptable methods include, but are not limited to, Kernel smoothing method;

Step A32: for the fitted probability density function, performing a classification of heavy-tailed distribution and light-tailed distribution.

FIG. 11A shows an example of a fitted result of a probability density function belonging to a heavy-tailed distribution, and FIG. 11B shows an example of a fitted result of a probability density function belonging to a light-tailed distribution. As can be seen, a fitted curve of the heavy-tailed distribution has a relatively small gradient absolute value, and a fitted curve of the light-tailed distribution has a relatively large gradient absolute value.

It should be noted that, the heavy-tailed distribution and the light-tailed distribution each do not refer to a specific distribution, but are general names of two classes of distributions. Further, it is possible to determine judgment criteria of the heavy-tailed distribution and the light-tailed distribution according to specific applications.

It is not necessary that all the processing in the above-mentioned exemplary process is performed by the electronic device according to the embodiment of the present disclosure. For example, the acquisition and the processing of the historical information may be performed in advance, and the estimation unit 111 may directly use the historical data to estimate a user behavior mode within a target time period.

Continuing with FIG. 1, the determination unit 113 is configured to determine, based on the communication service mode estimated by the estimation unit 111, a size of a primary exclusion zone to be applied to the user equipment.

According to an embodiment, the determination for the size of the primary exclusion zone may comprise:

estimating a communication resource demand of the user equipment within the target time period based on the estimated communication service mode; and determining the size of the primary exclusion zone based on the estimated resource demand.

The estimation for the resource demand may comprise:

performing a parameter estimation on a probability distribution of user data traffic amount corresponding to a state in the multistate model;

reconstructing a cumulative probability distribution of user data traffic amount using a result of the parameter estimation; and estimating a resource demand amount of the user equipment within the target time period based on the reconstructed cumulative probability distribution.

As an example but not a limitation, manners of the parameter estimation may include Moment estimation or Maximum likelihood estimation.

According to an embodiment, a data traffic amount corresponding to a threshold probability may be estimated as the resource demand amount, based on the reconstructed cumulative probability distribution.

Next, an exemplary manner of performing an analysis and a prediction of a user behavior according to the constructed model will be described in combination still with the examples of FIG. 11A and FIG. 11B. The purpose of the user behavior prediction is to make it convenient to perform a user protection and a resource allocation. The behavior prediction may comprise the following exemplary process:

Step B1: performing a parameter estimation on a probability distribution type of user data traffic amount corresponding to a certain state in the determined multistate Hidden Markov Model, including but not limited to Moment estimation or Maximum likelihood estimation;

Step B2: reconstructing a cumulative density function of user data traffic amount, according to a result of the parameter estimation in step B1;

Step B3: predicting a future resource demand of the user, according to the cumulative density function of user data traffic amount which was reconstructed in step B2.

In the above-mentioned exemplary manner, upon completion of the classifications on the probability distributions, it is possible to reconstruct a cumulative distribution function (CDF) through parameter extraction, and it is possible to predict a future resource demand of the user according to a probability needed to be satisfied. A probability satisfied by a demand of the primary user represents a degree of protection of the primary user, and when the degree of protection of the primary user needs to be changed, it is possible to change this parameter, thereby better protecting the primary user or giving consideration to demands of secondary users.

Figure 12:
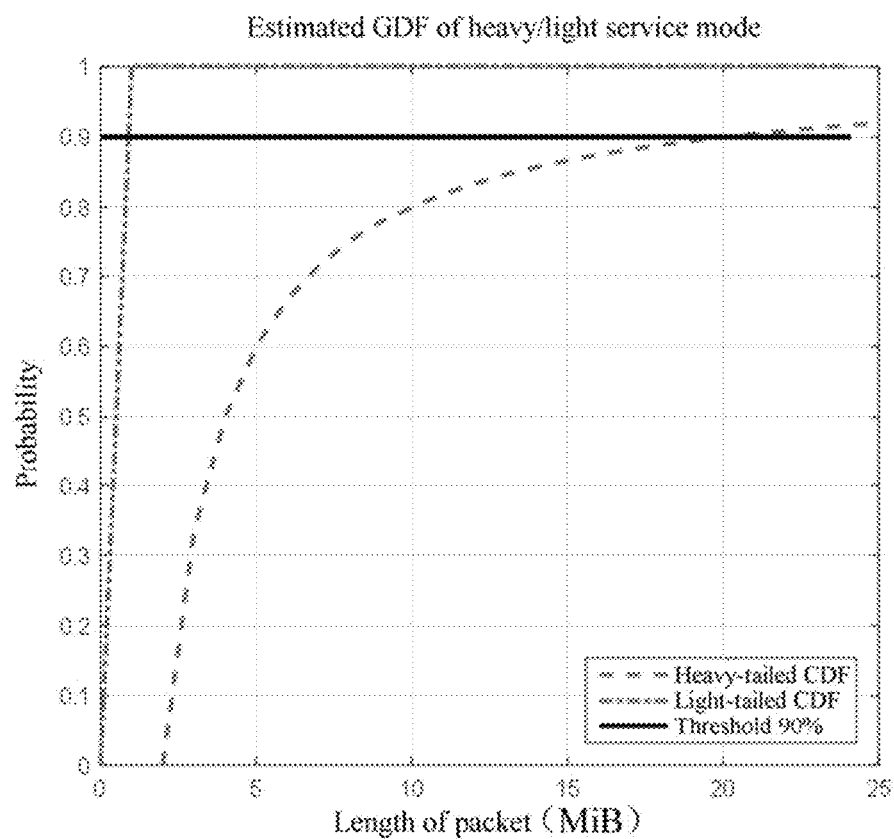
FIG. 12 shows an example of a reconstructed cumulative distribution function.

FIG. 12 shows CDFs corresponding to the probability density functions for the heavy-tailed distribution of FIG. 11A and the light-tailed distribution of FIG. 11B. Further, FIG. 12 also shows a threshold probability (e.g., 0.9). In the example, for the light-tailed distribution, a length of packet corresponding to the threshold probability is about 1 MiB, while for the heavy-tailed distribution, a length of packet corresponding to the threshold probability is about 20 MiB.

Based on the predicted resource demand, it is possible to correspondingly determine a size of a primary exclusion zone.

According to an embodiment, the determination for the size of the primary exclusion zone may comprise: determining a Signal to Interference plus Noise Ratio based on channel capacity corresponding to the resource demand; and determining the size of the primary exclusion zone based on the determined Signal to Interference plus Noise Ratio.

Next, an exemplary manner of determining the size of the primary exclusion zone based on the predicted resource demand will be described still with reference to the foregoing examples:

Step C1: determining a resource required by the user, according to the determined Hidden Markov Model and the probability needed to be satisfied;

Step C2: inversely calculating a Signal to Interference plus Noise Ratio in accordance with channel capacity, according to the resource required by the user predicted in step C1, and thereafter determining the size of the primary exclusion zone according to the Signal to Interference plus Noise Ratio as well as a channel model and a network parameter.

As an example, it is possible to calculate a radius of the primary exclusion zone (PEZ) according to the following equations (1) to (3).

$$Cap_s = B_{\mathit{eff}} \cdot \log_2(1 + SINR_{th}) \tag{1}$$

$$SINR_{th} = \frac{P_{PU} \cdot \Gamma(r_{TX})}{\sigma^2 + \eta \cdot \int_0^{2\pi} \int_{R_{PEZ}}^{\infty} \lambda_{AP}(r) \cdot P_{SU} \cdot \Gamma(r) \cdot r \, dr \, d\theta} \tag{2}$$

$$R_{PEZ} = d_{break} \cdot \exp\left(\frac{\sigma^2 - \frac{P_{PU}\beta}{r_{TX}^2 \cdot SINR_{th}}}{2\pi\lambda_{AP}\eta P_{SU}\beta}\right) \tag{3}$$

Wherein, $cap_s$ is a channel capacity, and the channel capacity within a unit time is an upper limit of resources required by the user. $B_{\mathit{eff}}$ is an effective bandwidth, $SINR_{th}$ is a lower limit of a required Signal to Interference plus Noise Ratio, $P_{PU}$ and $P_{SU}$ are transmitting powers of transmitters of primary user and secondary user, $\Gamma(.)$ is a path loss function, $\sigma^2$ is a channel noise, $\eta$ represents a probability of switch-on of a base station, $\Delta_{AP}(.)$ is a density function of a base station, $R_{PEZ}$ is a radius of the primary exclusion zone, and $r_{TX}$ represents a distance between the transmitter of the primary user and the primary user.

The equation (1) gives a relationship between the channel capacity $cap_s$ and the Signal to Interference plus Noise Ratio $SINR_{th}$. The equation (2) gives a relationship between the Signal to Interference plus Noise Ratio $SINR_{th}$ and the radius $R_{PEZ}$ of the primary exclusion zone.

The equation (3) is a closed-form solution of the radius of the exclusion zone when the density of the base station $\lambda_{AP}$ is a constant, under a channel model which has a breakpoint and for which an attenuation factor in the breakpoint is 2.

The equation (1) is used for calculating a Signal to Interference plus Noise Ratio threshold (SINRth) according to the effective bandwidth (Beff) and the channel capacitor (Caps). The equation (1) is based on Shannon formula. The channel capacity may be equal to a data traffic demand amount of the user in terms of numerical value.

The equation (2) is a definition equation of the Signal to Interference plus Noise Ratio. The numerator portion in the equation (2) is a transmitting power multiplied by a path loss, i.e., an effective signal receiving power at user end. $\sigma 2$ in the denominator in the equation (2) is a channel noise. The other item in the denominator in the equation (2) is a cumulative interference power expressed by double integration, which is equivalent to an integral of the product of a percentage occupied by switched-on base stations in total base stations, a density of base stations, a transmitting power of base stations and a path loss on a plane, with a range of the integral being from the radius of the exclusion zone to infinity.

Under the premise that the transmitting power of the transmitter and the SINR threshold needed to be satisfied as well as the channel bandwidth are known, a tolerable interference maximum power may be calculated if the channel model is known. A relationship between the maximum interference power and the radius of the exclusion zone is represented by the item which follows the plus sign in the denominator in the equation (2), and if it is put into the channel model, the equation (3) may be derived.

In the present example, the following path loss model is selected:

$$PL\ [dB] = \beta\ [dB] + 10\alpha\ \log_{10}(d) + \xi,\ \xi \sim N(0,\sigma^2)$$

Wherein, PL represents a path loss, $\beta$ is a free space path loss at a distance $d_0$ ($d_0=1$ m), which is a fixed loss, $\alpha$ is a loss coefficient, which is also a fixed value; $\xi$ is a random variable subject to normal distribution, and represents a random loss.

Assuming that the base station density function $\lambda_{AP}(r)$ is a fixed value, i.e., $\lambda_{AP}$, the path loss model may be simplified as:

$$\Gamma(d) = \beta \cdot \left(\frac{d}{d_0}\right)^{-2}$$

By putting the path loss model into the equation (2), it may be derived that:

$$SINR_{th}9\left(\sigma^2 + \eta \cdot 2\pi\lambda_{AP}\eta P_{SU}\beta \int_{R_{PEZ}}^{\infty} r^{-2} \cdot r dr\right) = P_{PU}\beta \cdot r_{TX}^{-2}$$

$$SINR_{th} \cdot [\sigma^2 + \eta \cdot 2\pi\lambda_{AP}\eta P_{SU}\beta \cdot (0 - \ln R_{PEZ})] = P_{PU}\beta \cdot r_{TX}^{-2}$$

$$\ln R_{PEZ} = \frac{\sigma^2 - \frac{P_{PU}\beta \cdot r_{TX}^{-2}}{SINR_{th}}}{\eta \cdot 2\pi\lambda_{AP}\eta P_{SU}\beta}$$

By adding a breakpoint distance $d_{break}$ into the above equation and writing it in an exponential form, the equation (3) may be derived.

Accordingly, according to one embodiment, the determination of the size of the primary exclusion zone is further based on one or more of: a base station density, a probability of switch-on of neighboring base stations, and a channel bandwidth.

According to the above-mentioned exemplary embodiment, after it has been determined, in a time-varying transfer probability model, which state the data traffic of the user is in, the method of Maximum likelihood estimation or Moment estimation may be employed to derive parameters in the heavy-tailed distribution or the light-tailed distribution from the historical data having been recorded. After the parameters of the probability distributions are derived, a cumulative distribution function may be reconstructed. In combination with a threshold probability, an upper limit of a user data amount under satisfaction of this probability may be calculated. The traffic data amount under the probability in combination with a predicted time cycle is equal to the capacity of the channel within this period of time in terms of numerical value. Accordingly, the required SINR threshold may be calculated according to the equation (1), and then the size of the primary exclusion zone which satisfies the SINR threshold may be calculated according to the equation (3).

In the above-mentioned embodiment, the size of the primary exclusion zone is determined while considering the demand of the primary user itself and the utilization rate of the network, making it possible to improve a utilization rate of radio spectrum resources while effectively protecting the primary user against interference.

Further, according to an embodiment, the determination unit 113 may be further configured to: determine the size of the primary exclusion zone such that a radius of the primary exclusion zone is no more than a distance to an adjacent primary user (preferably, 0.5 times lower than a distance to an adjacent primary user), thereby making it possible to avoid mutual interference between the primary users.

In addition, according to an embodiment, the determination unit 113 may be further configured to: adjust the size of the primary exclusion zone in a case where the present size of the primary exclusion zone fails to satisfy a communication demand of the user equipment. By introducing user behavior tendency and temporal correlation under the premise of dividing an exclusion zone range according to a primary user demand, it is possible to more effectively improve a resource utilization ratio and reduce energy consumption.

Figure 8:
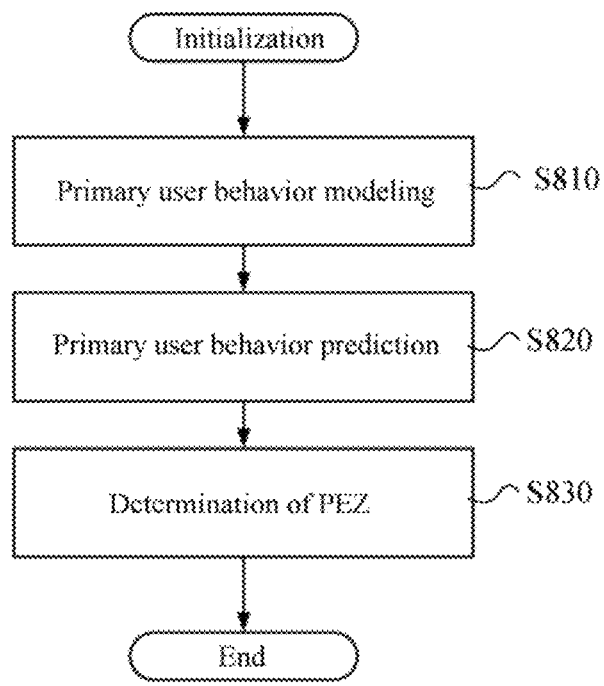
FIG. 8 shows an exemplary process of determining a primary exclusion zone based on a historical behavior.

Next, the manner of determining the primary exclusion zone in the above-mentioned exemplary embodiment will be briefly summarized with reference to FIG. 8. In S810 (e.g., corresponding to the foregoing exemplary processes A1-A5), a primary user behavior modeling is performed; in S820, a primary user behavior prediction is performed (e.g., corresponding to the foregoing exemplary processes B1-B3); in S830, the primary exclusion zone is determined (e.g., corresponding to the foregoing exemplary processes C1-C2).

Figure 9:
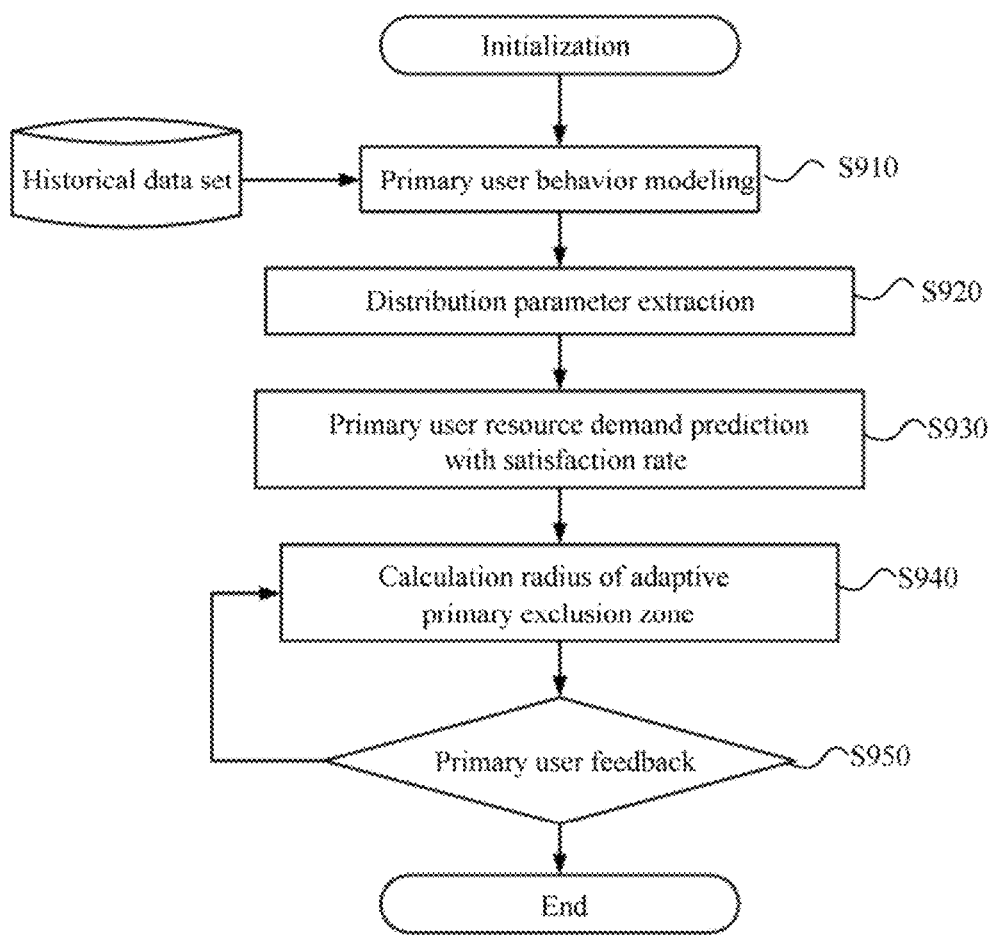
FIG. 9 shows another exemplary process of determining a primary exclusion zone based on a historical behavior.

FIG. 9 shows an exemplary process of determining a primary exclusion zone based on a historical behavior. In S910, a user behavior modeling is performed based on historical data; in S920, a distribution parameter extraction is performed; in S930, a primary user resource demand is predicted using a user demand satisfaction probability; and in S940, a radius of the primary exclusion zone is calculated, and it is possible to adaptively adjust the radius of the primary exclusion zone based on a user feedback (S950).

Figure 13:
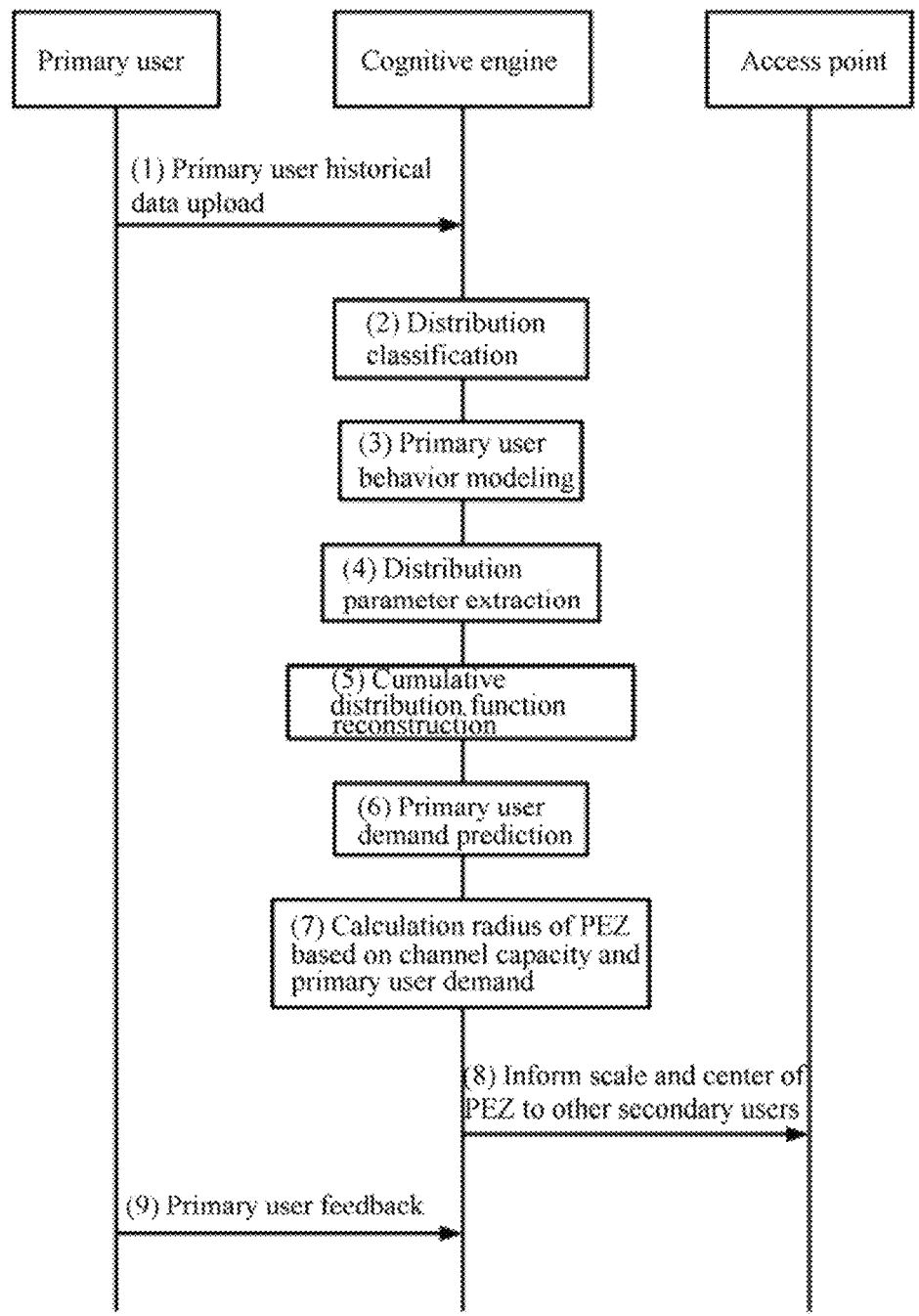
FIG. 13 shows an example of processing and information interaction of determining a primary exclusion zone based on a historical behavior.

Next, an example of processing and information interaction process corresponding to the above-mentioned exemplary embodiment will be illustrated with reference to FIG. 13.

(1) the primary user uploads a large number of user historical behavior data to a cognitive engine;

(2) the cognitive engine performs a classification on probability distribution types of the uploaded data on time, velocity and position;

(3) a time-varying, multistate Hidden Markov Model of a primary user behavior is established according to a classification result;

(4) the cognitive engine performs a parameter extraction of probability distributions on corresponding respective variables for probability distribution types having been classified, and adoptable methods include, but are not limited to, Maximum likelihood estimation, Moment estimation or the like;

(5) cumulative probability density functions of user-demanded resources on the respective variables are reconstructed according to the extracted parameters;

(6) a resource demand of the user is predicted according to the reconstructed cumulative probability density functions and the probability needed to be satisfied;

(7) a range of the primary exclusion zone is calculated according to the predicted user resource demand and the estimated channel capacity;

(8) the cognitive engine informs the range of the primary exclusion zone to base stations or wireless access points under the jurisdiction;

(9) upon completion of the division of the primary exclusion zone, the user feeds back a result of the division.

Next, the performance of the proposed solution will be described in combination with a simulation result. A simulation scenario selects an ultra dense network of a 28 GHz millimeter wave system, and a number of secondary users is larger than a number of primary users. Base stations under this scenario have a known geographical distribution model (specific position information of base stations may not be needed), and have a large number of user historical behavior records for performing a modeling of a user behavior. Base stations with the same performance are distributed within an area of 1000 meters×1000 meters. The channel model selects a path loss model with a breakpoint. Specific stimulation parameters are as shown in Table 2 below.

TABLE 2

| Parameters | Values |
| --- | --- |
| Operational frequency | 28 GHz |
| Channel bandwidth | 20 MHz |
| Number of UEs | 1 PU and 80 SU |
| Transmit power (Equivalent Isotropic Radiate Power (EIRP)) | 30 dBm |
| Minimum radius of PEZ | 40 m |
| Simulation area | 1000 m × 1000 m |
| Number of access points in simulation area | 40 |
| Geographical distribution of access points | Poisson point process |
| PEZ adjustment interval | 1 minute |

Figure 14:
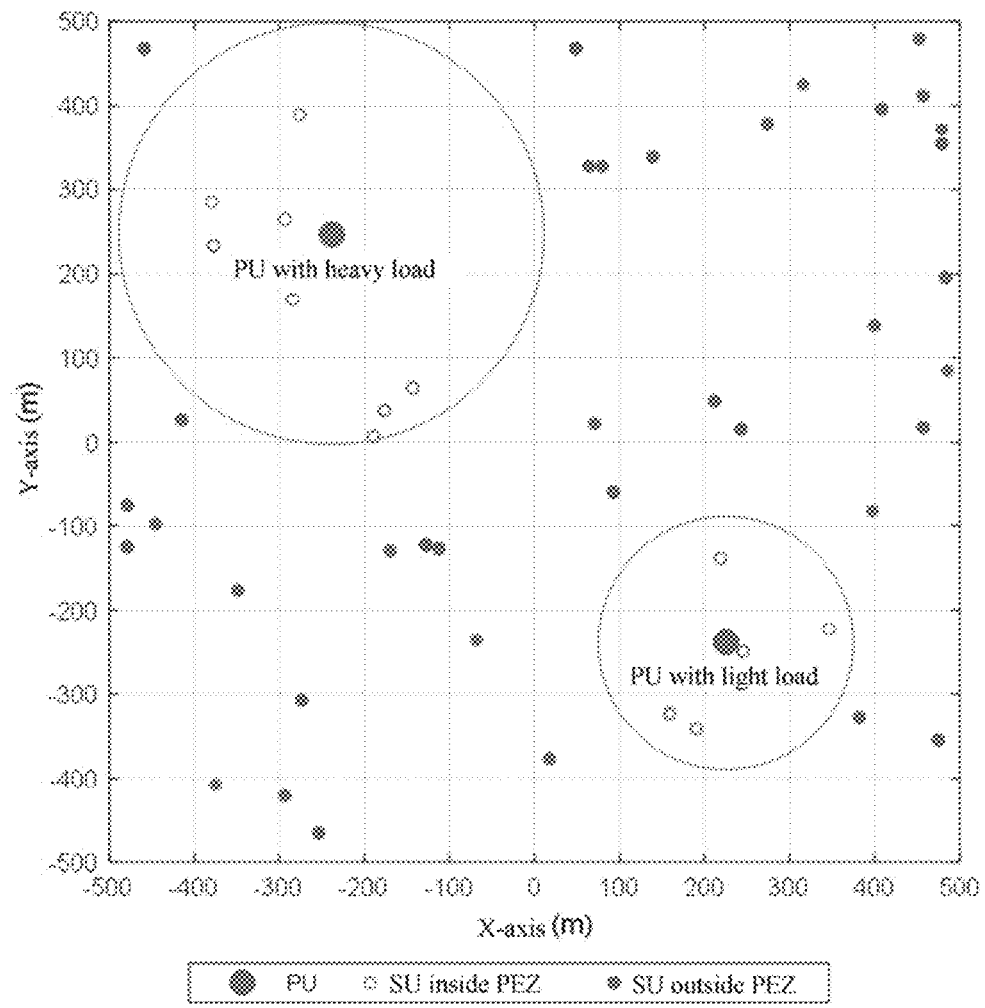
FIG. 14 shows a simulation scenario of determining an exclusion zone for a primary user.
Figure 15:
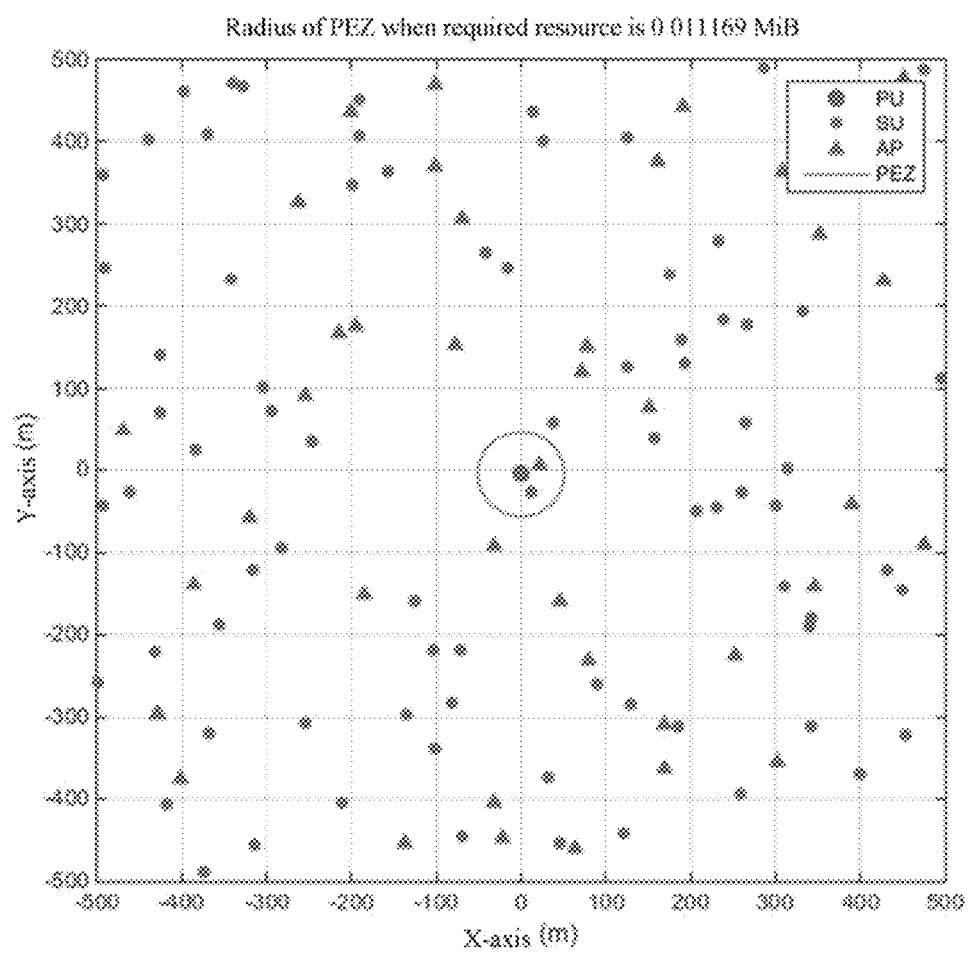
FIG. 15 shows an example of a radius of an exclusion zone which is determined according to a predicted user demand.
Figure 16:
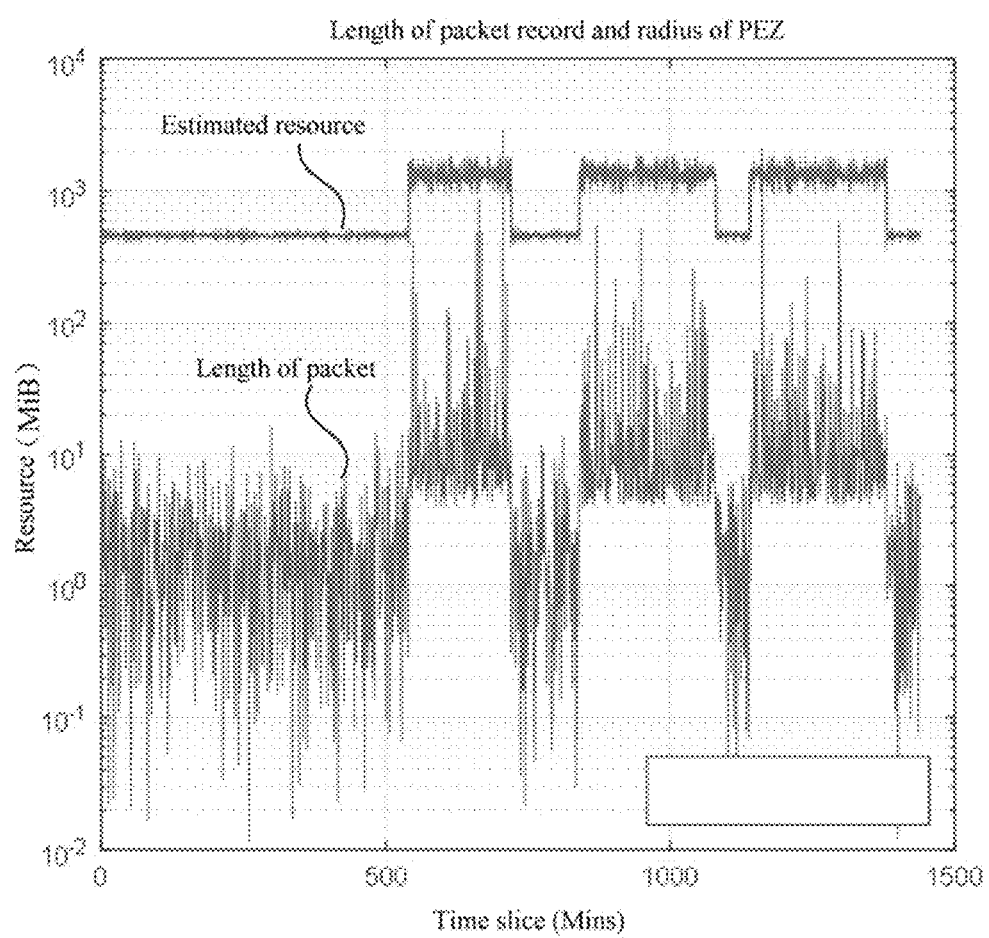
FIG. 16 shows a simulation result of a user demand and a resource allocation.

FIG. 14 to FIG. 16 show examples of execution results of the determination processes according to the exemplary embodiments of the present disclosure. Corresponding to the above-mentioned examples, based on the model of the user service states as shown in FIG. 10, it may be determined, through classifications, which state in FIG. 10 the user is in, and examples of classifications on the user service states are as shown in FIG. 11. In a case where the user service states have been determined, corresponding probability distributions are determined accordingly. FIG. 12 is an example of a result of performing a user service demand prediction after probability distributions and parameters of the probability distributions have been determined. FIG. 14 shows exclusion zones determined for a PU with a heavy load and a PU with a light load in a simulation scenario. FIG. 15 shows an example of a radius of an exclusion zone determined according to a predicted user demand, and although the figure only shows a PEZ radius at a certain specific time, the radius may be dynamically adjusted along with an estimated resource demand. FIG. 16 shows a simulation result of a user demand and a resource allocation, wherein the estimated resource (accordingly, the determined PEZ radius) can excellently correspond to a data traffic amount of the user. As can be seen from the above simulation result, the present solution may predict a future demand of the user according to a historical behavior of the user, and can satisfy user demands in most of environments.

In the foregoing description process of the device according to the embodiment of the present invention, some methods and processes obviously have also been disclosed. Next, a wireless communication method according to an embodiment of the present invention will be described without repeating the details having been described previously.

Figure 2:
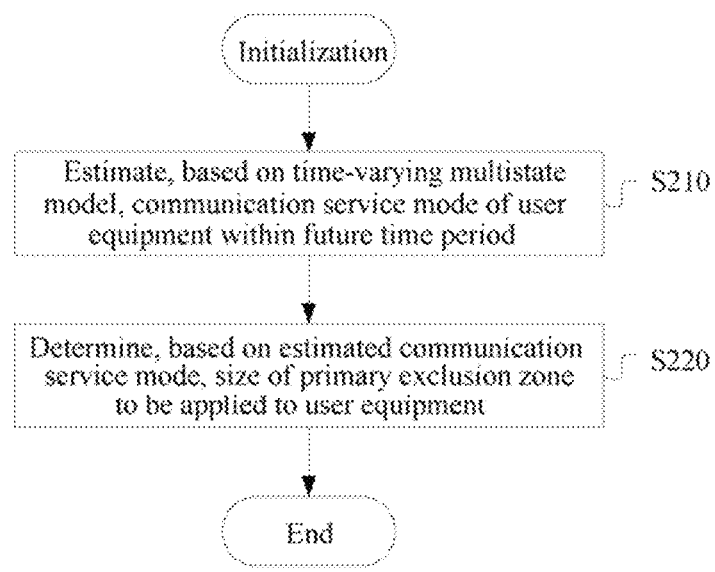
FIG. 2 is a flowchart showing a process example of a wireless communication method according to an embodiment of the present invention.

As shown in FIG. 2, a wireless communication method according to an embodiment comprise the following steps:

S210, estimating, based on a time-varying multistate model, a communication service mode of a user equipment within a target time period; and S220, determining, based on the estimated communication service mode, a size of a primary exclusion zone to be applied to the user equipment.

The embodiments at control node (cognitive engine) side (which may be realized at base station side, core network side and user equipment side) have been described above. Embodiments of the present disclosure further include a device and a method at a side where a determined size of a primary exclusion zone is received from a control node. The receiving side for example corresponds to the access point in FIG. 13, but the receiving side may comprise base station side, core network side and user equipment side.

Figure 3:
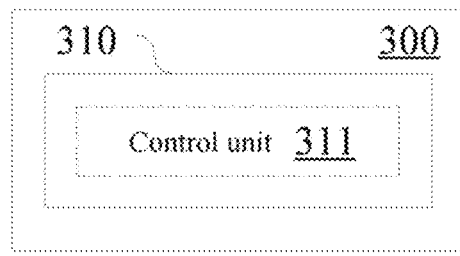
FIG. 3 is a block diagram showing a configuration example of an electronic device for wireless communication according to an embodiment of the present invention.

As shown in FIG. 3, an electronic device 300 for wireless communication according to the present embodiment comprises processing circuitry 310 (control unit 311) configured to perform control to receive indication information from a control node, the indication information indicating a size of a primary exclusion zone to be applied to a user equipment. The size of the primary exclusion zone is determined based on an estimation of a communication service mode of the user equipment within a target time period, the estimation being based on a time-varying multistate model.

Figure 4:
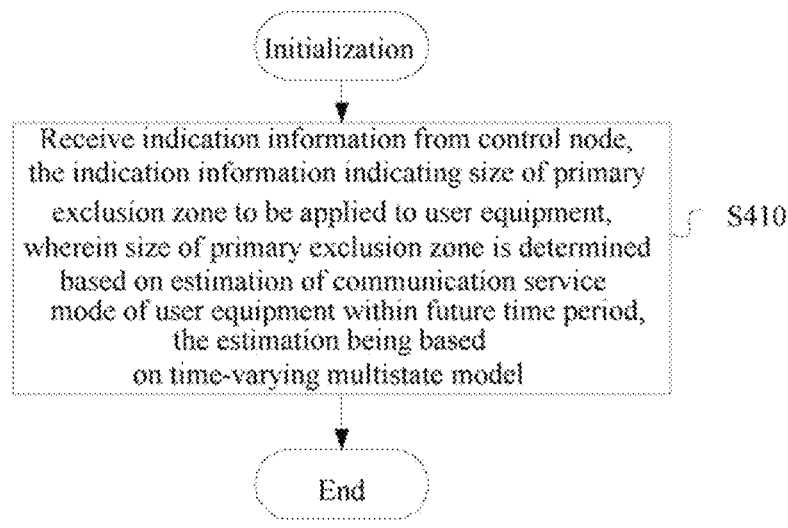
FIG. 4 is a flowchart showing a process example of a wireless communication method according to an embodiment of the present invention.

FIG. 4 shows an exemplary process of a corresponding wireless communication method, comprising:

S410, receiving indication information from a control node, the indication information indicating a size of a primary exclusion zone to be applied to a user equipment, wherein the size of the primary exclusion zone is determined based on an estimation of a communication service mode of the user equipment within a target time period, the estimation being based on a time-varying multistate mode.

Further, embodiments of the present disclosure further comprise a computer readable medium comprising executable instructions that, when executed by an information processing apparatus, cause the information processing apparatus to perform the methods according to the above-mentioned embodiments.

Figure 5:
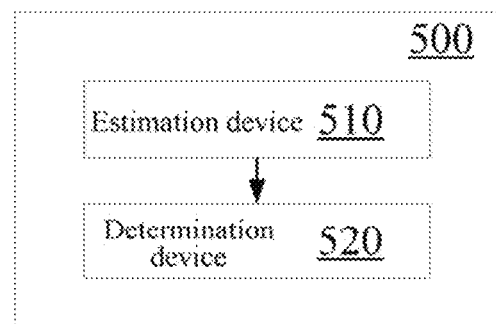
FIG. 5 is a block diagram showing a configuration example of an information processing apparatus according to an embodiment of the present invention.

As shown in FIG. 5, embodiments of the present disclosure further comprise an information processing apparatus 500, comprising an estimation device 510 and a determination device 520. The estimation device 510 is configured to estimate, based on a time-varying multistate model, a communication service mode of a user equipment within a target time period. The determination device 520 is configured to determine, based on the estimated communication service mode, a size of a primary exclusion zone to be applied to the user equipment.

Figure 6:
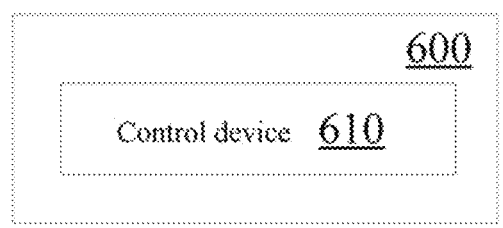
FIG. 6 is a block diagram showing a configuration example of an information processing apparatus according to an embodiment of the present invention.

As shown in FIG. 6, embodiments of the present disclosure further comprise an information processing apparatus 600, comprising a control device 610. The control device 610 is configured to perform control to receive indication information from a control node, the indication information indicating a size of a primary exclusion zone to be applied to a user equipment, wherein the size of the primary exclusion zone is determined based on an estimation of a communication service mode of the user equipment within a target time period, the estimation being based on a time-varying multistate model.

Figure 17:
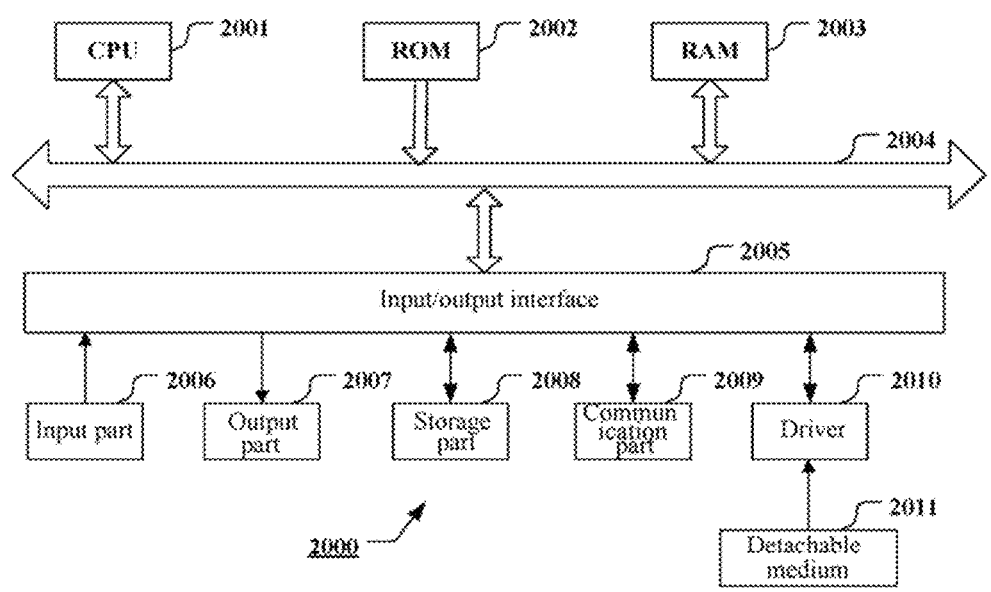
FIG. 17 is a block diagram showing an exemplary structure of a computer that realizes the methods and the apparatuses of the present disclosure.

As an example, the respective steps of the above methods and the respective constituent modules and/or units of the above devices may be implemented as software, firmware, hardware or a combination thereof. In the case of implementation by software or firmware, a program constituting the software for implementing the above methods may be installed from a storage medium or a network to a computer having a purpose-specific hardware structure (e.g., the universal personal computer 2000 as shown in FIG. 17). The computer, when installed with various programs, is capable of executing various functions and the like.

In FIG. 17, an operation processing unit (i.e., CPU) 2001 executes various processing according to a program stored in a Read-Only Memory (ROM) 2002 or a program uploaded from a storage part 2008 to a Random Access Memory (RAM) 2003. In the RAM 2003, data needed when the CPU 2001 executes various processing and the like is also stored as needed. The CPU 2001, the ROM 2002 and the RAM 2003 are linked to each other via a bus 2004. An input/output interface 2005 is also linked to the bus 2004.

The following components are linked to the input/output interface 2005: an input part 2006 (including a keyboard, a mouse and the like), an output part 2007 (including a display, such as a Cathode Ray Tube (CRT), a Liquid Crystal Display (LCD) and the like, as well as a speaker and the like), the storage part 2008 (including a hard disc and the like), and a communication part 2009 (including a network interface card such as an LAN card, a modem and the like). The communication part 2009 executes communication processing via a network such as the Internet. As needed, a driver 2010 may also be linked to the input/output interface 2005. A detachable medium 2011 such as a magnetic disc, an optical disc, a magnetic optical disc, a semiconductor memory and the like is installed on the driver 2010 as needed, such that a computer program read therefrom is installed in the storage part 2008 as needed.

In a case where the above series of processing is implemented by software, a program constituting the software is installed from a network such as the Internet or a storage medium such as the detachable medium 2011.

Those skilled in the art should appreciate that such a storage medium is not limited to the detachable medium 2011 having stored therein a program and distributed separately from an apparatus to provide the program to a user as shown in FIG. 17. Examples of the detachable medium 2011 include a magnetic disc (including a floppy disc (registered trademark)), a compact disc (including a Compact Disc Read-Only Memory (CD-ROM) and a Digital Versatile Disc (DVD)), a magnetic optical disc (including a Mini Disc (MD) (registered trademark)), and a semiconductor memory. Alternatively, the storage medium may be hard discs and the like included in the ROM 2002 and the storage part 2008, in which programs are stored, and which are distributed concurrently with the apparatus including them to users.

Embodiments of the present invention further relate to a program product having stored therein machine readable instruction codes that, when read and executed by a machine, can perform the above methods according to the embodiments of the present invention.

Accordingly, a storage medium for carrying the above program product having stored therein machine readable instruction codes is also included in the disclosure of the present invention. The storage medium includes but is not limited to a floppy disc, an optical disc, a magnetic optical disc, a memory card, a memory stick and the like.

Embodiments of the present application further relate to an electronic apparatus. The electronic apparatus, when used for base station side, may be realized as any type of Evolved node B (eNB), such as macro eNB and small eNB. The small eNB may be an eNB of a cell with smaller coverage than a macro cell, such as a pico eNB, a micro eNB and a home (femto) eNB. Alternatively, the electronic apparatus may be realized as any other type of base station, such as NodeB and Base Transceiver Station (BTS). The electronic apparatus may comprise: a main body (also referred to as a base station equipment) configured to control wireless communication; and one or more Remote Radio Heads (RRHs) arranged at different places from the main body. In addition, all the various types of terminals which will be described below can operate as base stations by temporarily or semi-persistently executing base station functions.

The electronic apparatus, when used for user equipment side, may be realized as a mobile terminal (such as an intelligent telephone, a tablet Personal Computer (PC), a notebook PC, a portable game terminal, a portable/softdog mobile router and a digital camera) or an in-vehicle terminal (such as an automobile navigation equipment). In addition, the electronic apparatus may be a wireless communication module (such as an integrated circuit module including a single or more wafers) installed on each of the above terminals.

[Application Example with Regard to Terminal Equipment]

Figure 18:
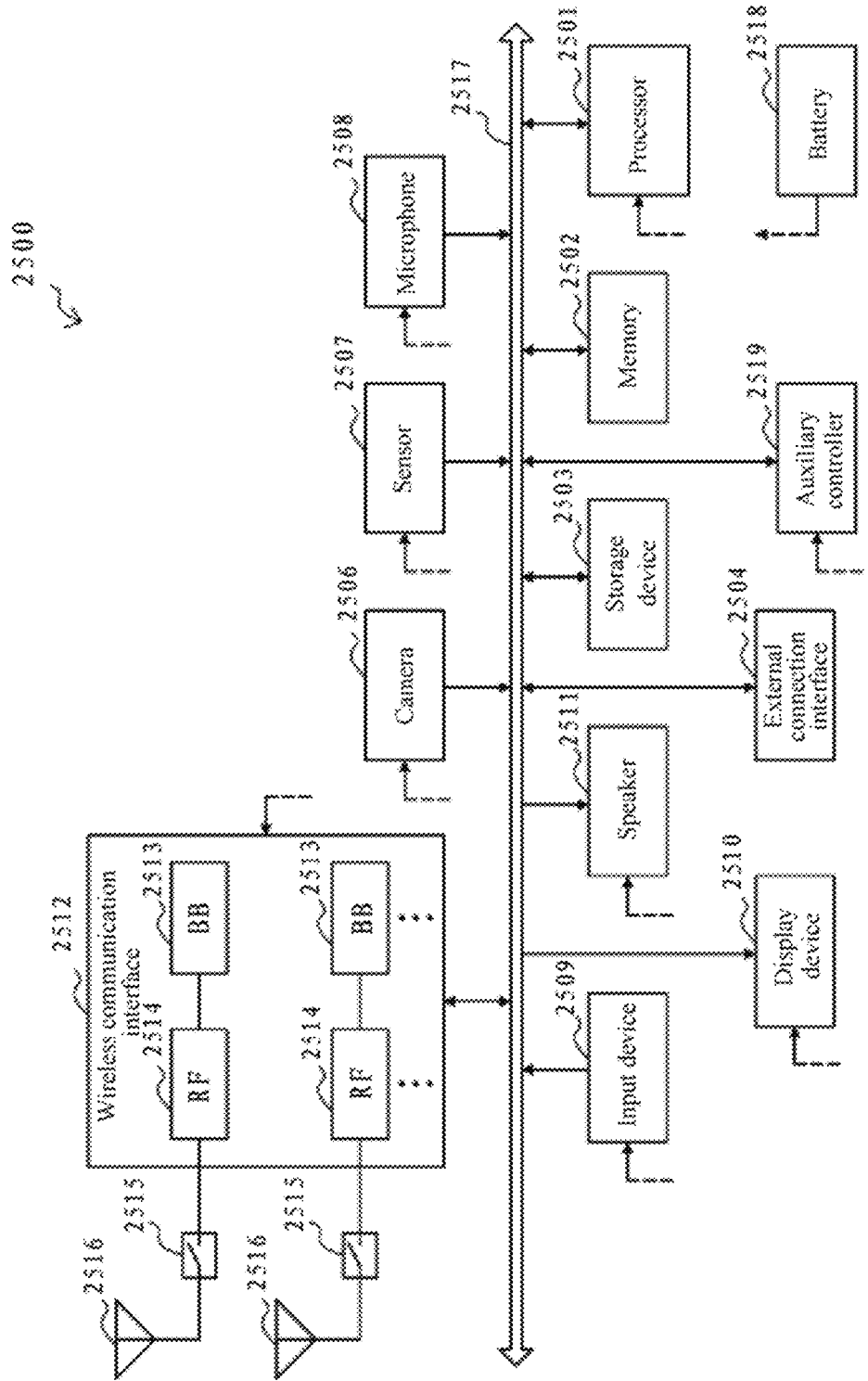
FIG. 18 is a block diagram showing an example of a schematic configuration of an intelligent telephone to which the technology of the present disclosure may be applied.

FIG. 18 is a block diagram showing an example of a schematic configuration of an intelligent telephone 2500 to which the technology of the present disclosure may be applied. The intelligent telephone 2500 comprises a processor 2501, a memory 2502, a storage device 2503, an external connection interface 2504, a camera 2506, a sensor 2507, a microphone 2508, an input device 2509, a display device 2510, a speaker 2511, a wireless communication interface 2512, one or more antenna switches 2515, one or more antennas 2516, a bus 2517, a battery 2518, and an auxiliary controller 2519.

The processor 2501 may be for example a CPU or a System on Chip (SoC), and control functions of an application layer and additional layers of the intelligent telephone 2500. The memory 2502 comprises an RAM and an ROM, and stores data and programs executed by the processor 2501. The storage device 2503 may comprise a storage medium, such as a semiconductor memory and a hard disc. The external connection interface 2504 is an interface for connecting an external device (such as a memory card and a Universal Serial Bus (USB) device) to the intelligent telephone 2500.

The camera 2506 comprises an image sensor (such as a Charge Coupled Device (CCD) and a Complementary Metal Oxide Semiconductor (CMOS)), and generates a captured image. The sensor 2507 may comprise a group of sensors, such as a measurement sensor, a gyro sensor, a geomagnetic sensor and an acceleration sensor. The microphone 2508 converts sound inputted to the intelligent telephone 2500 to an audio signal. The input device 2509 comprises for example a touch sensor configured to detect a touch on a screen of the display device 2510, a keypad, a keyboard, buttons or switches, and receives an operation or information inputted from a user. The display device 2510 comprises a screen (such as a Liquid Crystal Display (LCD) and an Organic Light-Emitting Diode (OLED) display), and displays an output image of the intelligent telephone 2500. The speaker 2511 converts the audio signal outputted from the intelligent telephone 2500 to sound.

The wireless communication interface 2512 supports any cellular communication scheme (such as LTE and LTE-Advanced), and executes wireless communication. The wireless communication interface 2512 generally may comprise for example a Base Band (BB) processor 2513 and a Radio Frequency (RF) circuit 2514. The BB processor 2513 may execute for example coding/decoding, modulation/demodulation and multiplexing/demultiplexing, and execute various types of signal processing for wireless communication. Meanwhile, the RF circuit 2514 may comprise for example a frequency mixer, a filter and an amplifier, and transmit and receive a wireless signal via the antenna 2516. The wireless communication interface 2512 may be a chip module on which a BB processor 2513 and an RF circuit 2514 are integrated. As shown in FIG. 18, the wireless communication interface 2512 may comprise a plurality of BB processors 2513 and a plurality of RF circuits 2514. Although FIG. 18 shows an example in which the wireless communication interface 2512 comprises a plurality of BB processors 2513 and a plurality of RF circuits 2514, the wireless communication interface 2512 may also comprise a single BB processor 2513 or a single RF circuit 2514.

In addition, besides the cellular communication schemes, the wireless communication interface 2512 may support other types of wireless communication schemes, such as a short range wireless communication scheme, a near field communication scheme and a wireless Local Area Network (LAN) scheme. In this case, the wireless communication interface 2512 may comprise a BB processor 2513 and an RF circuit 2514 for each wireless communication scheme.

Each of the antenna switches 2515 switches a connection destination of the antenna 2516 among a plurality of circuits included in the wireless communication interface 2512 (for example, circuits for different wireless communication schemes).

Each of the antennas 2516 comprises a single or more antenna elements (such as a plurality of antenna elements included in an MIMO antenna), and is used for the wireless communication interface 2512 to transmit and receive a wireless signal. As shown in FIG. 18, the intelligent telephone 2500 may comprise a plurality of antennas 2516. Although FIG. 18 shows an example in which the intelligent telephone 2500 comprises a plurality of antennas 2516, the intelligent telephone 2500 may also comprise a single antenna 2516.

In addition, the intelligent telephone 2500 may comprise an antenna 2516 for each wireless communication scheme. In this case, the antenna switch 2515 may be omitted from the configuration of the intelligent telephone 2500.

The bus 2517 connects the processor 2501, the memory 2502, the storage device 2503, the external connection interface 2504, the camera 2506, the sensor 2507, the microphone 2508, the input device 2509, the display device 2510, the speaker 2511, the wireless communication interface 2512 and the auxiliary controller 2519 to each other. The battery 2518 supplies electric power to the respective blocks of the intelligent telephone 2500 as shown in FIG. 18 via feeder lines which are partially shown as dashed lines in the figure. The auxiliary controller 2519 for example manipulates the least necessary function of the intelligent telephone 2500 in a sleep mode.

In the intelligent telephone 2500 as shown in FIG. 18, the transceiver device of the apparatus at user equipment side according to the embodiment of the present invention may be realized by the wireless communication interface 2512. At least part of the functions of the processing circuitry and/or respective units of the electronic device or information processing apparatus at user equipment side according to the embodiment of the present invention may also be implemented by the processor 2501 or the auxiliary controller 2519. For example, part of the function of the processor 2501 may be implemented by the auxiliary controller 2519 so as to reduce power consumption of the battery 2518. Further, the processor 2501 or the auxiliary controller 2519 may implement at least part of the functions of the processing circuitry and/or respective units of the electronic device or information processing apparatus at user equipment side according to the embodiment of the present invention by executing the program stored in the memory 2501 or the storage device 2503.

[Application Example with Regard to Base Station]

Figure 19:
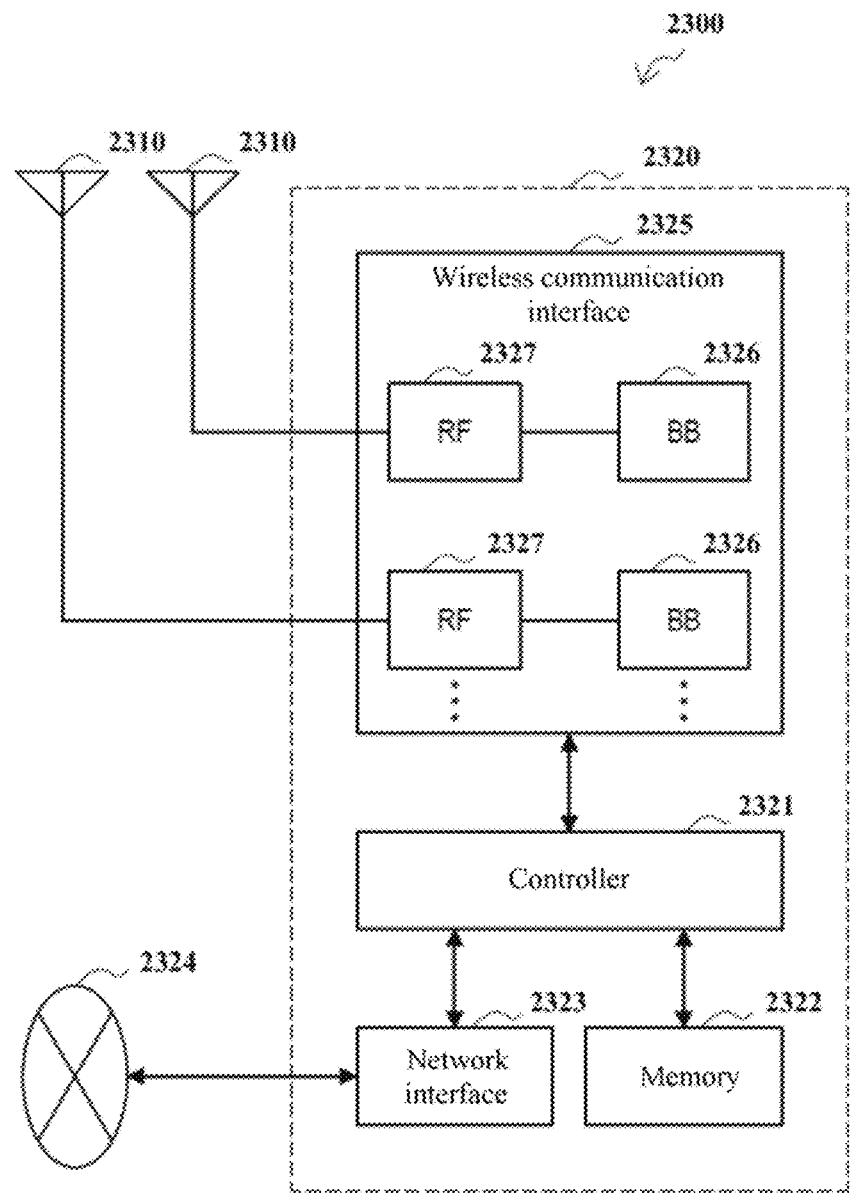
FIG. 19 is a block diagram showing an example of a schematic configuration of a base station to which the technology of the present disclosure may be applied.

FIG. 19 is a block diagram showing an example of a schematic configuration of a base station, e.g., an Evolved base station (eNB), to which the technology of the present disclosure may be applied. The eNB 2300 comprises one or more antennas 2310 and a base station equipment 2320. The base station equipment 2320 and each antenna 2310 may be connected with each other via a Radio Frequency (RF) cable.

Each of the antennas 2310 comprises a single or more antenna elements (such as a plurality of antenna elements included in a Multiple-Input Multiple-Output (MIMO) antenna), and is used for the base station equipment 2320 to transmit and receive a wireless signal. As shown in FIG. 19, the eNB 2300 may comprise a plurality of antennas 2310. For example, the plurality of antennas 2310 may be compatible with a plurality of frequency bands used by the eNB 2300. Although FIG. 19 shows an example in which the eNB 2300 comprises a plurality of antennas 2310, the eNB 2300 may also comprise a single antenna 2310.

The base station equipment 2320 may comprise a controller 2321, a memory 2322, a network interface 2323, and a wireless communication interface 2325.

The controller 2321 may be for example a CPU or a DSP, and manipulate various functions of a higher layer of the base station equipment 2320. For example, the controller 2321 generates data packets according to data in a signal processed by the wireless communication interface 2325, and transfers the generated packets via the network interface 2323. The controller 2321 may perform binding for data from a plurality of baseband processors to generate bound packets, and transfer the generated bound packets. The controller 2321 may have a logic function of executing control, which is such as radio resource control, radio bearer control, mobility management, admission rule and dispatching. The control may be performed in combination with a nearby eNB or a core network node. The memory 2322 comprises an RAM and an ROM, and stores programs executed by the controller 2321 and various types of control data (such as a terminal list, transmission power data, and scheduling data).

The network interface 2323 is a communication interface for connecting the base station equipment 2320 to a core network 2324. The controller 2321 may communicate with a core network node or another eNB via the network interface 2323. In this case, the eNB 2300 and the core network node or another eNB may be connected to each other via a logic interface (such as S1 interface and X2 interface). The network interface 2323 may also be a wired communication interface, or a wireless communication interface for a wireless backhaul. If the network interface 2323 is a wireless communication interface, as compared with frequency bands used by the wireless communication interface 2325, the network interface 2323 may use higher frequency bands for wireless communication.

The wireless communication interface 2325 supports any cellular communication scheme (such as Long Term Evolution (LTE) and LTE-Advanced), and is provided with a wireless connection to a terminal located in a cell of the eNB 2300 via the antenna 2310. The wireless communication interface 2325 generally may comprise for example a BB processor 2326 and an RF circuit 2327. The BB processor 2326 may execute for example coding/decoding, modulation/demodulation and multiplexing/demultiplexing, and execute various types of signal processing of layers (for example L1, Medium Access control (MAC), Radio Link Control (RLC) and Packet Data Convergence Protocol (PDCP)). Instead of the controller 2321, the BB processor 2326 may have part or all of the above logic function. The BB processor 2326 may be a memory which stores a communication control program, or a module comprising a processor configured to execute a program and a related circuit. The function of the BB processor 2326 may be changed through program updating. The module may be a card or blade inserted in a slot of the base station equipment 2320. Alternatively, the module may also be a chip installed on a card or blade. Meanwhile, the RF circuit 2327 may comprise for example a frequency mixer, a filter and an amplifier, and transmit and receive a wireless signal via the antenna 2310.

As shown in FIG. 19, the wireless communication interface 2325 may comprise a plurality of BB processors 2326. For example, the plurality of BB processors 2326 may be compatible with a plurality of frequency bands used by the eNB 2300. As shown in FIG. 19, the wireless communication interface 2325 may comprise a plurality of RF circuits 2327. For example, the plurality of RF circuits 2327 may be compatible with a plurality of antenna elements. Although FIG. 19 shows an example in which the wireless communication interface 2325 comprises a plurality of BB processors 2326 and a plurality of RF circuits 2327, the wireless communication interface 2325 may also comprise a single BB processor 2326 or a single RF circuit 2327.

In the eNB 2300 as shown in FIG. 19, the transceiver device of the apparatus at base station side according to the embodiment of the present invention may be realized by the wireless communication interface 2325. At least part of the functions of the processing circuitry and/or respective units of the electronic device or information processing apparatus at base station side according to the embodiment of the present invention may also be implemented by the controller 2321. For example, the controller 2321 may implement at least part of the functions of the processing circuitry and/or respective units of the electronic device or information processing apparatus at base station side according to the embodiment of the present invention by executing a program stored in the memory 2322.

In the foregoing description of the detailed embodiments of the present invention, features described and/or shown with respect to one embodiment may be used in one or more other embodiments in an identical or similar manner, be combined with features in other embodiments, or substitute features in other embodiments.

It should be emphasized that, the term "comprise/include" used herein refers to existence of features, elements, steps or assemblies, but does not preclude existence or addition of one or more other features, elements, steps or assemblies.

In the above embodiments and examples, reference numerals composed of digits are used to represent the respective steps and/or units. Those ordinarily skilled in the art should understand that, these reference numerals aim only to facilitate description and plotting, but do not represent an order thereof or any other limitation.

Further, the methods of the present invention are not limited to be executed in the temporal order described in the specification, but may also be executed sequentially, in parallel or independently in other orders. Therefore, the execution order of the methods described in the present specification does not constitute a limitation to the technical scope of the present invention.

Although the present invention has been disclosed above by the description of the detailed embodiments of the present invention, it should be understood that all the above embodiments and examples are exemplary but not limiting. Those skilled in the art could design various modifications, improvements or equivalents with regard to the present invention within the spirit and scope of the appended claims. These modifications, improvements or equivalents should also be construed as being included within the scope of protection of the present invention.

The invention claimed is:

1. An electronic device for wireless communication, comprising:
   processing circuitry configured to:
   estimate, based on a time-varying multistate model, a communication service mode of a user equipment within a target time period; and
   determine, based on the estimated communication service mode, a size of a primary exclusion zone to be applied to the user equipment.

2. The electronic device according to claim 1, wherein the multistate model is derived based on historical data comprising a user position and/or a user displacement, time and a user data traffic amount.

3. The electronic device according to claim 1, wherein the communication service mode comprises a mode in which a probability distribution of a user data traffic amount is a heavy-tailed distribution, and a mode in which a probability distribution of a user data traffic amount is a light-tailed distribution.

4. The electronic device according to claim 1, wherein the estimation for the communication service mode comprises:
   determining, based on historical data of the user equipment, a distribution type of data traffic amount of the user equipment in a plurality of historical time periods corresponding to the target time period; and
   estimating, based on the distribution type, the communication service mode of the user equipment within the target time period.

5. The electronic device according to claim 1, wherein the determination for the size of the primary exclusion zone comprises:
  estimating a communication resource demand of the user equipment within the target time period based on the estimated communication service mode; and
  determining the size of the primary exclusion zone based on the estimated resource demand.

6. The electronic device according to claim 5, wherein the estimation for the resource demand comprises:
  performing a parameter estimation on a probability distribution of user data traffic amount corresponding to a state in the multistate model;
  reconstructing a cumulative probability distribution of user data traffic amount using a result of the parameter estimation; and
  estimating a resource demand amount of the user equipment within the target time period based on the reconstructed cumulative probability distribution.

7. The electronic device according to claim 5, wherein determining the size of the primary exclusion zone based on the estimated resource demand comprises:
  determining a Signal to Interference plus Noise Ratio according to channel capacity based on the estimated resource demand; and
  determining the size of the primary exclusion zone based on the determined Signal to Interference plus Noise Ratio as well as a channel model and a network parameter.

8. The electronic device according to claim 6, wherein a data traffic amount corresponding to a threshold probability is estimated as the resource demand amount, based on the reconstructed cumulative probability distribution.

9. The electronic device according to claim 5, wherein the determination for the size of the primary exclusion zone comprises:
  determining a Signal to Interference plus Noise Ratio based on channel capacity corresponding to the resource demand; and
  determining the size of the primary exclusion zone based on the determined Signal to Interference plus Noise Ratio.

10. The electronic device according to claim 1, wherein the determination of the size of the primary exclusion zone is further based on one or more of: a base station density, a probability of switch-on of neighboring base stations, and a channel bandwidth.

11. The electronic device according to claim 1, wherein the processing circuitry is further configured to: determine the size of the primary exclusion zone such that a radius of the primary exclusion zone is lower than a distance to an adjacent primary user.

12. The electronic device according to claim 1, wherein the processing circuitry is further configured to: adjust the size of the primary exclusion zone in a case where the present size of the primary exclusion zone fails to satisfy a communication demand of the user equipment.

13. The electronic device according to claim 1, wherein the multistate model is obtained by:
  performing a first classification on user data traffic amounts according to time, user position and/or user displacement, based on a historical record of historical behavior of a primary user;
  for each class obtained by the first classification, performing a second classification on probability distributions of the user data traffic amounts; and
  determining respective types of the probability distributions as a hypothesis set of the multistate model.

14. The electronic device according to claim 13, wherein the second classification comprises:
  for a classification result of the first classification, constructing a fitted probability density function for user data traffic amounts for a corresponding classification; and
  for the fitted probability density function, performing a classification of heavy-tailed distribution and light-tailed distribution.

15. A wireless communication method, comprising:
  estimating, based on a time-varying multistate model, a communication service mode of a user equipment within a target time period; and
  determining, based on the estimated communication service mode, a size of a primary exclusion zone to be applied to the user equipment.

16. An electronic device for wireless communication, comprising:
  processing circuitry configured to:
  perform control to receive indication information from a control node, the indication information indicating a size of a primary exclusion zone to be applied to a user equipment,
  wherein the size of the primary exclusion zone is determined based on an estimation of a communication service mode of the user equipment within a target time period, the estimation being based on a time-varying multistate model.

* * * * *